United States Patent
Takagi et al.

(10) Patent No.: US 6,833,878 B2
(45) Date of Patent: Dec. 21, 2004

(54) CHANNEL SELECTION DEVICE FOR USE IN BROADCASTING RECEIVER AND BROADCASTING RECEIVER EQUIPPED WITH THE SAME

(75) Inventors: Toshihiro Takagi, Takatsuki (JP); Kazuhide Ishihara, Kadoma (JP); Yusuke Nishida, Ikoma (JP)

(73) Assignee: Funai Electric Co., Ltd., Daito (JP)

( * ) Notice: Subject to any disclaimer, the term of this patent is extended or adjusted under 35 U.S.C. 154(b) by 510 days.

(21) Appl. No.: 10/076,419

(22) Filed: Feb. 19, 2002

(65) Prior Publication Data
US 2002/0113895 A1 Aug. 22, 2002

(30) Foreign Application Priority Data
Feb. 16, 2001 (JP) ........................................ 2001-039329

(51) Int. Cl.[7] ................................................. H04N 5/44
(52) U.S. Cl. ...................................... 348/734; 348/731
(58) Field of Search ................................ 348/734, 725, 348/731, 553, 569; 340/825.69, 825.72; 725/38; 455/77

(56) References Cited

U.S. PATENT DOCUMENTS

| | | | | |
|---|---|---|---|---|
| 4,207,522 A | * | 6/1980 | Thornton et al. ............. | 455/77 |
| 5,045,946 A | * | 9/1991 | Yu .............................. | 348/565 |
| 5,161,023 A | * | 11/1992 | Keenan ....................... | 348/732 |
| 5,193,005 A | * | 3/1993 | Tomita ........................ | 348/731 |
| 5,544,130 A | * | 8/1996 | Mizuno et al. ................ | 369/1 |
| 5,926,206 A | * | 7/1999 | Mihara et al. .............. | 725/102 |
| 6,037,877 A | * | 3/2000 | Matthews .................... | 340/2.4 |

FOREIGN PATENT DOCUMENTS

JP        2000-244284        9/2000

* cited by examiner

Primary Examiner—Victor R. Kostak
(74) Attorney, Agent, or Firm—Crowell & Moring LLP

(57) ABSTRACT

In a channel selection device used in a broadcasting receiver, each time a channel UP/DOWN key is pressed for changing a channel, the channel number is changed upward/downward by one immediately and, when the key is continuously held down for at least a predetermined time lapse, the first digit of the channel number is cleared to 0 and then the channel number is changed upward/downward by 10 every constant time lapse. Therefore, the channel can be changed constantly free of a fluctuation in changing speed with passing time, so that even an unskilled user can easily guess the time required to reach his desired channel to thereby get it in a short time.

5 Claims, 6 Drawing Sheets

CHANNEL

FIG. 4A  FIG. 4B

FIG. 4A channels 001–020 with 005, 010, 020 marked; 006 highlighted.

FIG. 4B channels 001–020 with 006, 017 marked; 007 highlighted.

CHANNEL       CHANNEL

CHANNEL SELECTION DEVICE FOR USE IN BROADCASTING RECEIVER AND BROADCASTING RECEIVER EQUIPPED WITH THE SAME

BACKGROUND OF THE INVENTION

The invention relates to a channel selection device used in a television for receiving a digital/analog broadcast, and a broadcasting receiver equipped with the same.

In current digital broadcasting, various broadcasting signals carrying a variety of contents are output through many channels. For example, not less than 100 channels are used in broadcasting by the North America digital broadcasting standard of ATSC (Advanced Television Systems Committee), to originate, besides a conventional analog broadcast, digital broadcasts such as a BS (Broadcasting Satellite) digital broadcast and a CS (Communication Satellite) digital broadcast which are capable of high picture-quality and multi-channel broadcasting, each of which digital broadcasts is originated by a carrier wave of a predetermined frequency band through a physical channel different from that of an analog broadcast.

With more channels used in such a manner, it takes time and labor more for the user to change the channel using the channel UP/DOWN key in order to reach a desired channel if he changes the channel number upward or downward one by one. To guard against it, there is known such a channel selection device available that, when an operation instruction is given continuous, changes a selection frequency greatly at a time to thereby reach a desired frequency in a short time (see, for example, Japanese Unexamined Patent Publication No. 2000-244284). As for such a channel selection operation, an example where the time for the channel to be changed is decreased as time passes by is shown in FIG. 3A and another example where the number of the channel to be skipped is increased as time passes by is shown in FIG. 3B.

In the channel selection operation, however, the channel changing speed changes as time passes by when the operation is given continuous, so that an unskilled user cannot guess the channel changing speed owing to an excessively short channel changing time or an excessively many skipped channels, so that he may pass over his desired channel readily and feel uncomfortable in use.

SUMMARY OF THE INVENTION

The present invention is made to solve the above-mentioned problems and, it is an object of the invention to provide such an easy-to-use channel selection device for use in broadcasting receivers and a broadcasting receiver equipped with the same that is constant in channel changing speed with passing time when a user changes the channel so that the user, even if he is unskilled, can guess the changing channel and reach his desired channel in a short time.

In accordance with an aspect of the present invention, a channel selection device used in a broadcasting receiver, comprises: a receiving section for receiving an encoded digital/analog broadcasting signal originated from a broadcasting station; a digital/analog decoder for decoding the digital/analog broadcasting signal received from the receiving section and then outputting the signal to a display device for displaying an image; a control unit for controlling the sections of the receiver; and an input device for inputting a user's instruction for channel selection to the control unit, wherein: the control unit controls the device so that, when having received the channel selection instruction from the input device, a display device displays a selected channel number and the receiving section receives the broadcasting signal of the selected channel; characterized in that, the control unit, in channel changing on the basis of operations of a channel UP/DOWN key provided on the input device, each time the key is pressed, changes the channel number upward/downward by one and, when the key is continuously held down at least for a predetermined time lapse, clears the first digit of the channel number to 0 to thereafter change the channel number upward/downward by 10 every constant time lapse.

In the device of the invention, each time the channel UP/DOWN key is pressed for changing the channel, the channel number is immediately changed upward/downward by one and, when this key is held down continuously at least for a predetermined time lapse (e.g., one second or so), the first digit of the channel number is cleared to 0 so that the channel number is changed upward/downward by 10 every constant time lapse (e.g., 0.3 second). Thus, the channel number changes by 10 every constant lapse of time, thus providing a constant changing speed with passing time. The user can change the channel number upward/downward as confirming its changing state visually on a display to thereby easily guess a time required to reach his desired channel and actually reach it easily and in a short time.

In the device of the invention, when the UP/DOWN key is operated for changing a predetermined value, almost the same actions as above can be obtained by holding the key down for at least a predetermined time lapse. This device, therefore, can be applied not only to channel selection but also to, for example, time setting to make reservation for recording a broadcast program.

BRIEF DESCRIPTION OF THE DRAWINGS

FIGS. 4A and 4B are illustrations for showing channel changing techniques by the device of the invention.

DETAILED DESCRIPTION OF THE PREFERRED EMBODIMENT OF THE PRESENT INVENTION

Figure 1:
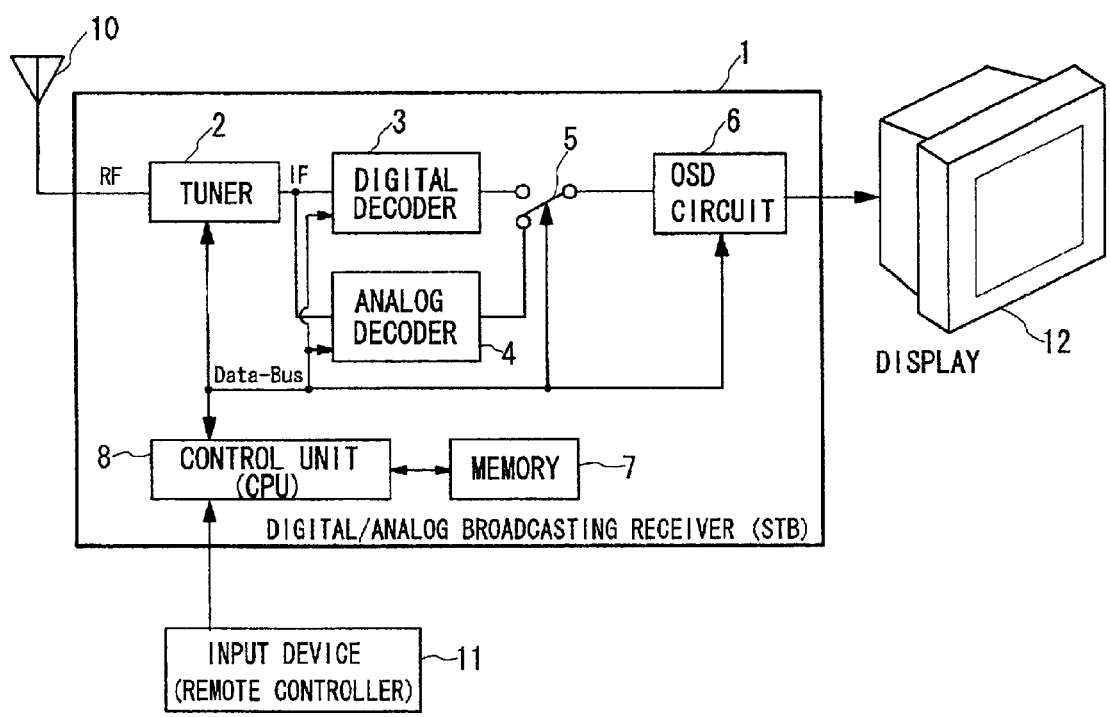
FIG. 1 is a block diagram for showing a digital/analog broadcasting receiver equipped with a channel selection device according to one embodiment of the invention.

The following will describe a digital/analog broadcasting receiver equipped with a channel selection device according to one embodiment of the invention with reference to the drawings. FIG. 1 is a block diagram of the digital/analog broadcasting receiver (hereinafter abbreviated as receiver). A receiver 1 decodes and analyzes a broadcasting signal to obtain a VCT (Virtual Channel Table) containing virtual channel information based on PSIP (Program System Information Protocol) and hold a channel map storing this table, so that when a user changes or selects a channel, based on this channel map, an EPG (Electric Program Guide) functioning as an interface is used to display a channel selection display to thereby operate the key (e.g., UP key/DOWN key)

at the body's operation section or a remote-controller, thus enabling him to change or select the channel. That is, the receiver 1 is a set top box (STB) that receives at an antenna 10 an encoded radio-frequency (RF) digital/analog broadcasting signal originated from a TV broadcasting station to then display a list of the channel information which can be received by a display device 12 for displaying on a display an video signal contained in the broadcasting signal in response to instructions for channel information display input by the user by use of an input device 11 such as the body button or a later-described remote controller 30 shown in FIG. 2.

The receiver 1 comprises a tuner 2 (receiving section) for receiving a digital/analog broadcasting signal which is present in a frequency band corresponding to a desired channel, a digital decoder 3 and an analog decoder 4 for decoding the digital/analog broadcasting signal received at the tuner 2, a switch 5 for switching the broadcasting signal decoded by the digital decoder 3 and the analog decoder 4, an OSD circuit 6 for providing predetermined onscreen display (hereinafter abbreviated as OSD) at a display 12, a memory 7 for storing originating frequencies of each digital broadcasting main channel and channel configuration information, and a control unit 8 consisting of a CPU for controlling these sections of the receiver.

The tuner 2 is supplied with the digital/analog broadcasting signal received through the antenna 10 to then select a channel according to an instruction the user input to the control unit 8 by the input device 11 to thereby receive a digital/analog broadcasting signal in a frequency band corresponding to the input channel and modulate it into an intermediate frequency (IF) signal and then output it to the digital decoder 3 and the analog decoder 4. The digital decoder 3 and the analog decoder 4 decode the broadcasting signal received by the tuner 2. In the digital broadcasting channel configuration, each main channel is assigned each frequency band so that the sub-channels of the same main channel are used to originate broadcasting signals of the same frequency. However, physical channels are different in digital broadcasting even using a virtual channel headed by the same number as that of analog broadcasting, so that the broadcasting signal is originated by a carrier wave of a different frequency band. When a user-selected channel is of digital broadcasting (if the sub-channels are not of number "0"), the broadcasting signal is decoded by the digital decoder 3. When the user-selected channel is of analog broadcasting (if the sub-channels are of number "0"), the signal is decoded by the analog decoder 4.

The switch 5 receives an instruction from the control unit 8 to then output to the OSD circuit 6 the broadcasting signal decoded by either the digital decoder 3 or the analog decoder 4. The OSD circuit 6 receives an instruction from the control unit 8 to then output the broadcasting signal to the display 12 and also output an OSD display signal for displaying a predetermined list of receivable channel information. The memory 7 stores the information of each channel's frequency band and the channel configuration information as well as the information of OSD display at the time of shipment of the receiver.

The control unit 8 receives a user's input through the input device 11 to then control the sections through a data bus (Data-Bus) and instructs the memory 7 to store the information of each channel's frequency band and the received channel information, thus referring to the information in case of need, for example, when a channel is selected.

Also, the control unit 8 receives a user's instruction for channel changing to then instruct the tuner 2 to receive a broadcasting signal containing channel configuration information and then analyzes a VCT given as the channel information obtained by decoding this broadcasting signal at the digital decoder 3, thus obtaining a status signal contained therein. This status signal generally contains information of all digital/analog sub-channels in a virtual main channel. The control unit 8, therefore, can analyze the VCT to thereby obtain virtual channel numbers consisting of the same number (main channel) as the conventional channel number given to the same or the same system of broadcasting station originating the digital/analog broadcasting signal and sub-channel numbers. That is, the control unit 8 can collectively obtain the digital/analog channel information originated from the same or the same system of broadcasting station. The control unit 8 stores thus obtained status signal in the memory 7, thus storing the channel information therein.

Further, the control unit 8, when having received a user's instruction from the input device 11, refers to the data stored in the memory 7 to then indicate in OSD display a channel information table on the display 12 and also moves a displayed cursor for channel selection to thereby display a television program of a selected broadcast.

The display 12 may be a display unit of a television, a CRT (Cathode Ray Tube), or a flat panel display such as an LCD (Liquid Crystal Display) or PDP (Plasma Display Panel). Although not shown, the receiver 1 is equipped with a D/A converter circuit for converting a digital signal into an analog one so that the signal for the OSD display or image display is converted by this D/A converter circuit into an analog signal and then output to the display 12. Also, the D/A converter circuit may be built in the display 12. When the flat panel display is used, the signal bypasses the D/A converter circuit and is output as digital signal as it is.

Figure 2:
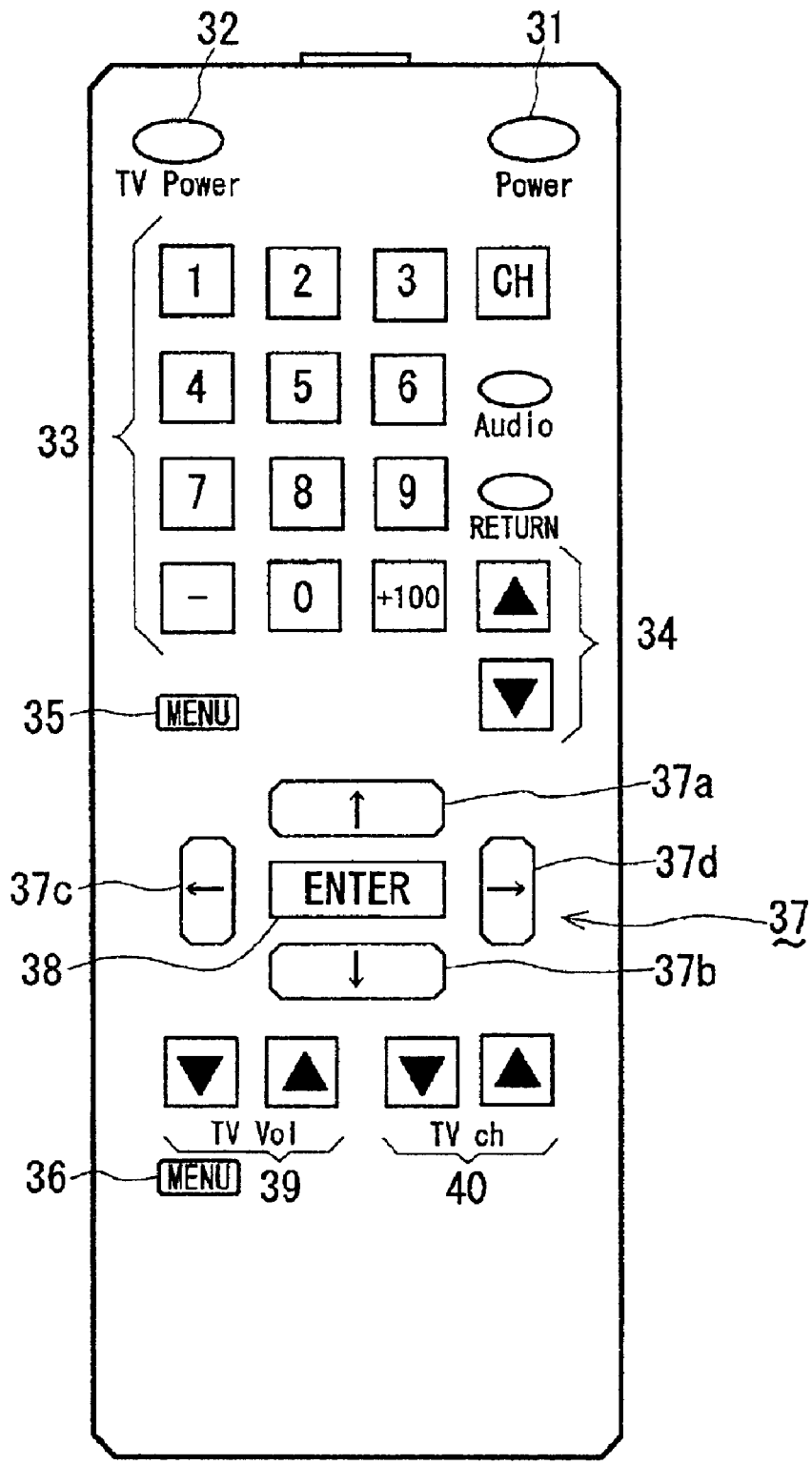
FIG. 2 is a plan view for showing a remote controller which constitutes part of the channel selection device.
Figures 3A, 3B:
FIGS. 3A and 3B are illustrations for showing prior art techniques of changing a channel.

The input device 11 is used to input a user's instruction to the control unit 8. The input device 11 may come in the body button provided on the front panel of the receiver 1 or the remote controller 30 such as shown in FIG. 2. In FIG. 2, the remote controller 30 is adapted to give an instruction in the form of an infrared ray etc. to operate the receiver 1 and the television, comprising power keys 31 and 32 for turning ON or OFF respectively the power supplies of the receiver 1 and the television, a numeric key 33 for inputting a channel number of the receiver 1, a channel UP/DOWN key pair 34 for changing the channel, menu keys 35 and 36 for calling a menu display of the receiver 1 and the television respectively, keys 37 (37a–37d) for moving the cursor in any desired directions, an entry (ENTER) key 38 for assuring an input, a sound-volume UP/DOWN key pair 39 for adjusting a sound volume of the television, and a channel UP/DOWN key pair 40 for changing the television channel.

Of the keys 37, the RIGHT/LEFT keys 37c and 37d are assigned for moving the cursor to change the main channel, while the UP/DOWN keys 37a and 37b are assigned for moving the cursor to thereby switch the sub-channel in each main channel. The assignment of the UP/DOWN keys 37a and 37b and the RIGHT/LEFT keys 37c and 37d may be reversed.

FIGS. 4A and 4B show examples of channel changing by operation of the channel UP/DOWN key 34. These examples indicate downward changing of the channel number, so that to change it upward, reverse the operation procedure. In FIG. 4A, each time the key 34 is operated, the channel number is changed upward/downward by one and, when the key 34 is held down for at least a predetermined time lapse, the first digit of the channel number is cleared to 0, to thereby change the channel number upward/downward by 10 every constant time lapse. In this example, the channel number is changed from "005" to "006" and then to "010", "020", . . . in this order. In FIG. 4B, each time the channel UP/DOWN key 34 is operated, the channel number is changed upward/downward by one, and when the key 34 is held down for at least a predetermined time lapse, the channel number is changed upward/downward by 10 every constant time lapse. In this example, the channel number is changed from "006 to "007" and then to "017, "027", . . . in this order.

Figure 5:
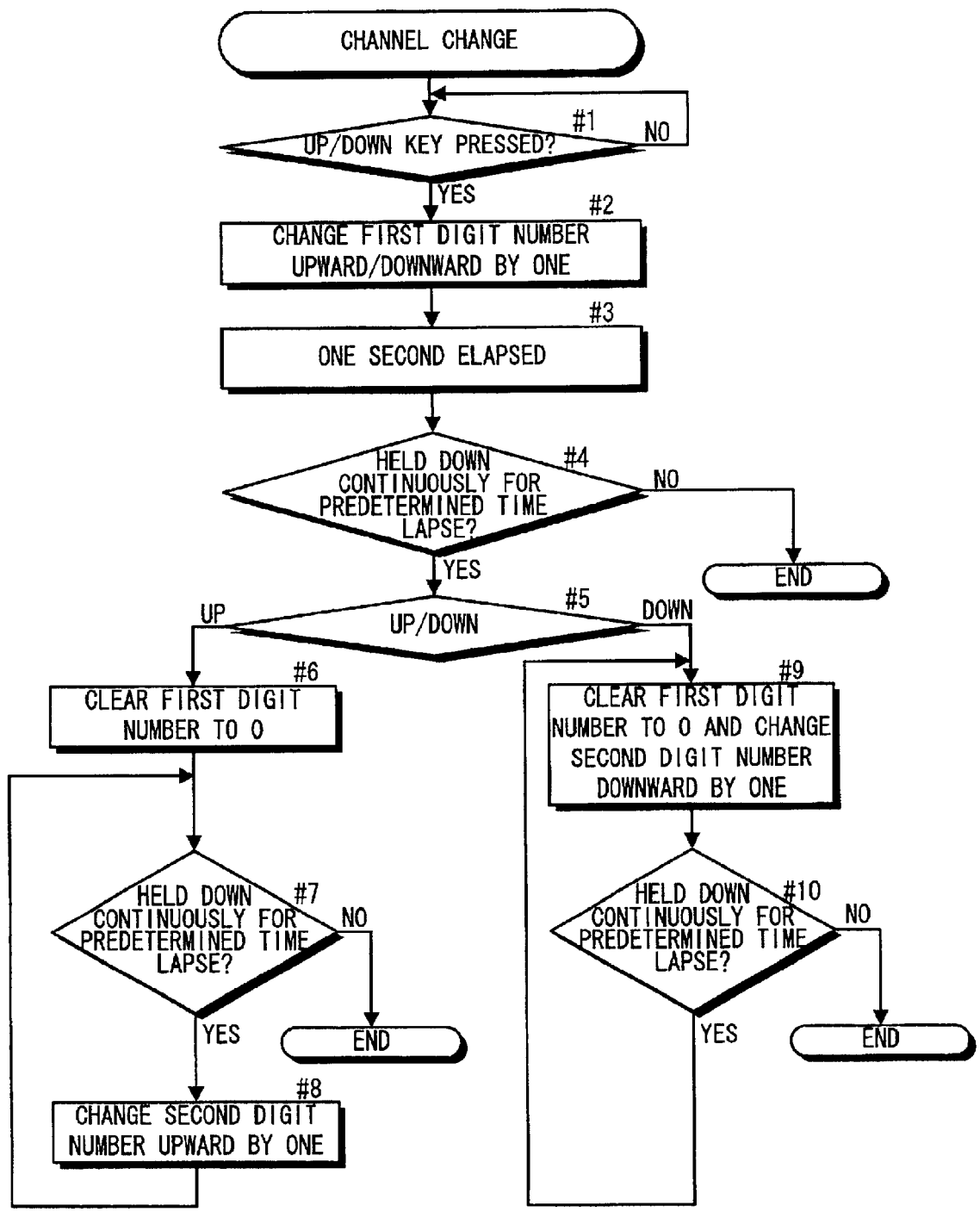
FIG. 5 is a flowchart for showing the channel changing technique of FIG. 4A.

FIG. 5 is a flowchart for showing a procedure of processing by the control unit 8 for changing the channel number shown in FIG. 4A. When the channel UP/DOWN key 34 is pressed (YES is answered at #1), the channel number is changed upward/downward by one immediately (#2) and, after a predetermined time lapse (e.g., one second or so) elapses (#3), if the key 34 is continuously held down for a further predetermined time lapse (e.g., 0.3 second) (YES is answered at #4), in the case of upward changing, the first digit of the channel number is cleared to 0 (#6) and the second digit thereof is incremented by one, that is, the channel number is incremented by 10 every constant time lapse (e.g., 0.3 second) (#7, #8). In the case of downward changing, the first digit of the channel number is cleared to 0 and the second digit thereof is decremented by one (#9), that is, the channel number is decremented by 10 every constant time lapse (e.g., 0.3 second) (#9, #10). Thus, the channel number is changed by 10 every constant time lapse. Therefore, the user only needs to operate the channel UP/DOWN key as confirming its changing state visually on the display 12 to thereby guess the time required to reach his desired channel until he can reach it easily and in a short time.

Figure 6:
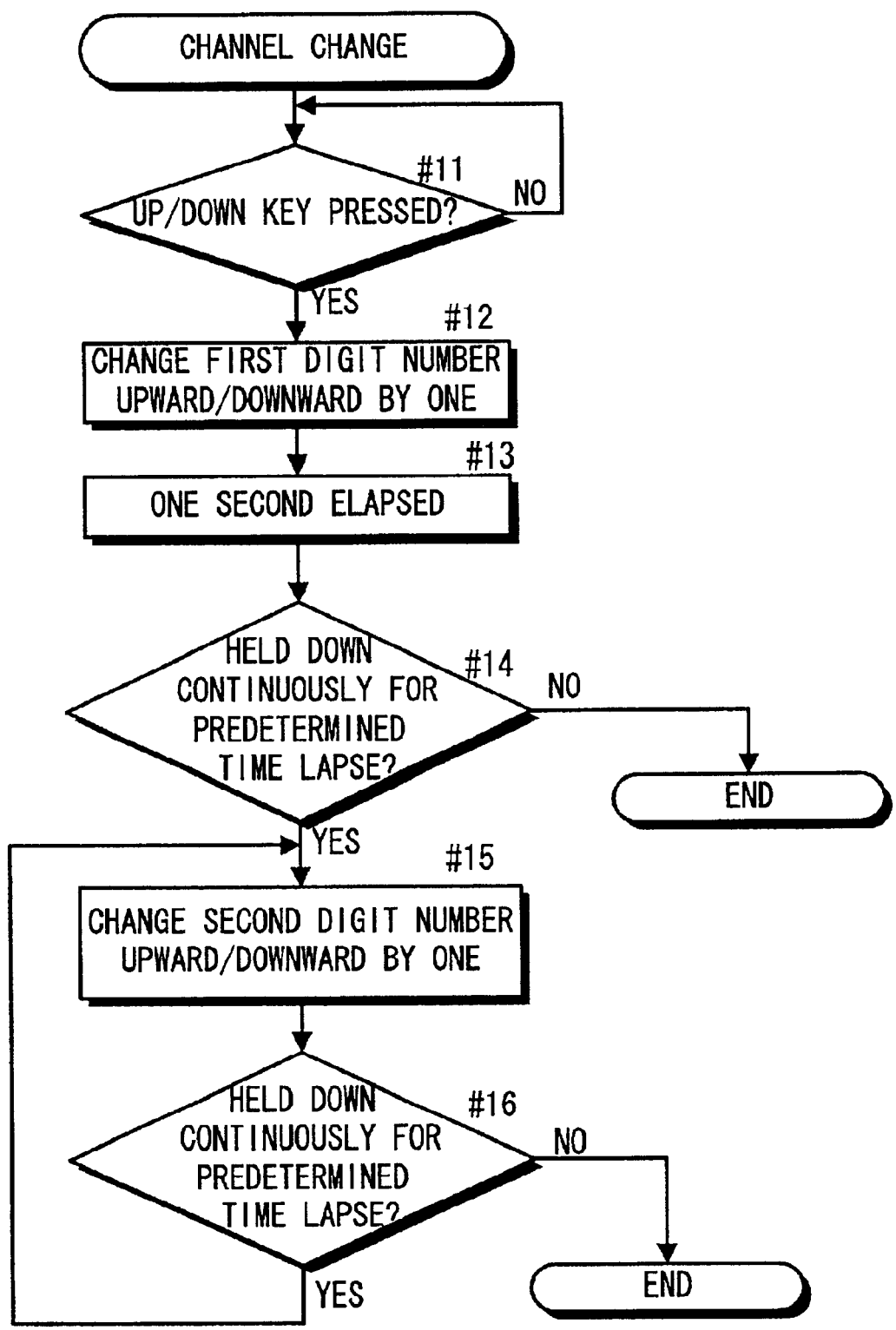
FIG. 6 is a flowchart for showing the channel changing technique of FIG. 4B.

FIG. 6 is a flowchart for showing a procedure of processing by the control unit 8 for changing the channel number shown in FIG. 4B. When the channel UP/DOWN key 34 is pressed (YES is answered at #11), the channel number is changed upward/downward by one immediately (#12) and, after a predetermined time lapse (e.g., one second or so) elapses (#13), if the key 34 is continuously held down for a further predetermined time lapse (e.g., 0.3 second) (YES is answered at #14), the second digit of the channel number is changed upward/downward by one (#15). This case also gives almost the same actions as the above.

The present invention is not limited to this embodiment but applicable to many variants; for example, the receiver 1 may be built in the body of a television or a VCR (Video Cassette Recorder). Also, the above-mentioned changing method can be applied not only to a case of changing the channel but also to a case of changing a predetermined value of timer for reserved picture recording when the receiver 1 is provided with a picture recording function and also to a case of setting a sound volume, which are all covered by the invention.

What is claimed is:

1. A channel selection device used in a broadcasting receiver, comprising: a receiving section for receiving an encoded digital/analog broadcasting signal originated from a broadcasting station; a digital/analog decoder for decoding the digital/analog broadcasting signal received from the receiving section and then outputting the signal to a display device for displaying an image; a control unit for controlling the sections of the receiver; and an input device for inputting a user's instruction for channel selection to the control unit, wherein: the control unit controls the device so that, when having received the channel selection instruction from the input device, a display device displays a selected channel number and the receiving section receives the broadcasting signal of the selected channel; characterized in that, the control unit, in channel changing on the basis of operations of a channel UP/DOWN key provided on the input device, each time the key is pressed, changes the channel number upward/downward by one and, when the key is continuously held down at least for a predetermined time lapse, clears the first digit of the channel number to 0 to thereafter change the channel number upward/downward by 10 every constant time lapse.

2. A channel selection device used in a broadcasting receiver, comprising: a receiving section for receiving an encoded digital/analog broadcasting signal originated from a broadcasting station; a digital/analog decoder for decoding the digital/analog broadcasting signal received from the receiving section and then outputting the signal to a display device for displaying an image; a control unit for controlling the sections of the receiver; and an input device for inputting a user's instruction for channel selection to the control unit, wherein: the control unit controls the device so that, when having received the channel selection instruction from the input device, a display device displays a selected channel number and the receiving section receives the broadcasting signal of the selected channel; characterized in that, the control unit, in channel changing on the basis of operations of a channel UP/DOWN key provided on the input device, each time the key is pressed, changes the channel number upward/downward by one and, when the key is continuously held down at least for a predetermined time lapse, changes the channel number upward/downward by 10 every constant time lapse.

3. A broadcasting receiver equipped with the selection device according to claim 2.

4. An operation device used in a broadcasting receiver, comprising: a control unit for controlling sections of the receiver; and an input device for a user to input an arbitrary predetermined value to the control unit, wherein: the control unit controls the device so that a display device displays the predetermined value according to an instruction from the input device and a memory stores the predetermined value, thus conducting control according to the predetermined value; characterized in that, the control unit, in changing the predetermined value by operating an UP/DOWN key provided on the input device, each time the key is pressed, changes the predetermined value upward/downward by one and, when the key is continuously held down at least for a predetermined time lapse, changes the predetermined value upward/downward by 10 every constant time lapse.

5. A broadcasting receiver equipped with the operation device according to claim 4.

* * * * *